(12) United States Patent
Sauter et al.

(10) Patent No.: US 11,351,715 B2
(45) Date of Patent: Jun. 7, 2022

(54) DEVICE FOR PRODUCING CONTAINER PRODUCTS FROM PLASTICS MATERIAL

(71) Applicant: KOCHER-PLASTIK MASCHINENBAU GMBH, Sulzbach-Laufen (DE)

(72) Inventors: Roland Sauter, Sulzbach-Laufen (DE); Johannes Geser, Gerlingen (DE); Michael Spallek, Ingelheim (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 971 days.

(21) Appl. No.: 15/026,264

(22) PCT Filed: Jan. 13, 2015

(86) PCT No.: PCT/EP2015/000039
§ 371 (c)(1),
(2) Date: Mar. 31, 2016

(87) PCT Pub. No.: WO2015/113730
PCT Pub. Date: Aug. 6, 2015

(65) Prior Publication Data
US 2016/0243749 A1 Aug. 25, 2016

(30) Foreign Application Priority Data
Jan. 31, 2014 (DE) .................... 10 2014 001 446.0

(51) Int. Cl.
*B29C 49/70* (2006.01)
*B29C 49/64* (2006.01)
(Continued)

(52) U.S. Cl.
CPC .............. *B29C 49/70* (2013.01); *B29C 49/64* (2013.01); *B29C 49/0021* (2013.01);
(Continued)

(58) Field of Classification Search
CPC ..... B29C 49/64; B29C 49/70; B29C 49/0021; B29C 2049/6661; B29C 49/6427; B65B 2220/24; B65B 9/042
(Continued)

(56) References Cited

U.S. PATENT DOCUMENTS 2,844,846 A * 7/1958 Kronholm ............... B29C 48/10
425/72.1
3,303,243 A * 2/1967 Hughes ................... B29C 49/00
264/456
(Continued)

FOREIGN PATENT DOCUMENTS

DE 1 492 450 4/1970
DE 31 41 069 5/1983
(Continued)

OTHER PUBLICATIONS

International Search Report (ISR) dated May 12, 2015 in International (PCT) Application No. PCT/EP2015/000039.

*Primary Examiner* — Thomas M Wittenschlaeger
*Assistant Examiner* — Katie L Gerth
(74) *Attorney, Agent, or Firm* — Wenderoth, Lind & Ponack, L.L.P.

(57) ABSTRACT

A device produces at least one container product made of plastics material, which is molded by a molding device (1). The container product is filled with a predefinable container content by a filling device and closed by a closing device. The finished container product is fed to a post-treatment zone in which the container product and/or the respective container content is subjected to a temperature-influencing effect.

29 Claims, 4 Drawing Sheets

(51) Int. Cl.
    *B29C 49/48*     (2006.01)
    *B29C 49/04*     (2006.01)
    *B29C 49/00*     (2006.01)
    *B29K 23/00*     (2006.01)
    *B29L 31/00*     (2006.01)

(52) U.S. Cl.
    CPC ...... *B29C 49/04* (2013.01); *B29C 2049/4869* (2013.01); *B29C 2049/701* (2013.01); *B29K 2023/0633* (2013.01); *B29K 2023/12* (2013.01); *B29L 2031/712* (2013.01)

(58) Field of Classification Search
    USPC .................. 53/440, 452, 559, 561; 452/72.1
    See application file for complete search history.

(56) References Cited

U.S. PATENT DOCUMENTS

| | | | | |
|---|---|---|---|---|
| 3,370,999 A * | 2/1968 | Schwarzrock | B32B 27/00 | 156/244.14 |
| 3,382,644 A * | 5/1968 | Vogt | B65B 1/02 | 53/455 |
| 3,541,189 A * | 11/1970 | Hiromitsu | B29C 49/10 | 264/449 |
| 3,542,570 A * | 11/1970 | Bush | B65B 51/306 | 426/413 |
| 3,597,516 A * | 8/1971 | Harwood | B29C 49/38 | 264/525 |
| 3,626,589 A * | 12/1971 | Hansen | B29C 49/0021 | 425/307 |
| 3,707,591 A * | 12/1972 | Chalfant | B29C 49/063 | 264/520 |
| 3,771,931 A * | 11/1973 | Fischer | B29C 49/6445 | 425/72.1 |
| 4,073,121 A * | 2/1978 | Greenawalt | B29C 66/1122 | 53/511 |
| 4,074,504 A * | 2/1978 | Greenawalt | B29C 65/10 | 53/433 |
| 4,109,792 A * | 8/1978 | Greenawalt | B65B 9/207 | 206/525 |
| 4,589,837 A | 5/1986 | Di Settembrini | | |
| 4,707,966 A * | 11/1987 | Weiler | B29C 65/56 | 264/524 |
| 4,983,333 A * | 1/1991 | Blew | B29C 48/06 | 264/1.25 |
| 5,356,052 A | 10/1994 | Poynter | | |
| 5,656,305 A * | 8/1997 | Venrooij | B23Q 7/10 | 425/145 |
| 6,171,541 B1 * | 1/2001 | Neter | B29C 35/16 | 264/328.14 |
| 6,361,301 B1 * | 3/2002 | Scaglotti | B29C 49/6445 | 264/454 |
| 6,521,155 B1 * | 2/2003 | Wunsch | B29B 7/00 | 264/150 |
| 6,813,576 B1 * | 11/2004 | Topf | B29C 48/09 | 702/99 |
| 6,838,041 B2 * | 1/2005 | Rowley | B29B 13/024 | 264/266 |
| 7,556,487 B2 * | 7/2009 | Acar | A23G 4/20 | 425/133.1 |
| 8,137,096 B2 * | 3/2012 | Hansen | B29C 49/0021 | 425/537 |
| 8,257,073 B2 * | 9/2012 | Quetel | B29C 49/46 | 425/210 |
| 8,574,477 B2 * | 11/2013 | Derrien | B29C 35/16 | 198/803.3 |
| 2002/0014055 A1 * | 2/2002 | Iwasa | B65B 57/08 | 53/551 |
| 2002/0180116 A1 * | 12/2002 | Weeks | B29C 37/02 | 264/536 |
| 2004/0096531 A1 * | 5/2004 | Prudhomme | B29C 48/08 | 425/72.1 |
| 2004/0185136 A1 * | 9/2004 | Domodossola | B29C 45/7207 | 425/547 |
| 2005/0127571 A1 * | 6/2005 | Weinmann | B29C 45/7626 | 264/408 |
| 2005/0133970 A1 * | 6/2005 | Unterlander | B29C 45/4225 | 264/528 |
| 2005/0248054 A1 * | 11/2005 | Bates | B29C 43/08 | 264/237 |
| 2006/0062870 A1 * | 3/2006 | Cyphert | B29C 48/30 | 425/326.1 |
| 2006/0202374 A1 * | 9/2006 | Pelcz | B29C 48/913 | 264/146 |
| 2007/0102835 A1 * | 5/2007 | Appleton | B29C 35/0277 | 264/1.32 |
| 2008/0041023 A1 * | 2/2008 | Tsuruta | B29C 66/8181 | 53/548 |
| 2008/0258325 A1 * | 10/2008 | Zimmermann | B29C 48/913 | 264/40.6 |
| 2009/0071104 A1 * | 3/2009 | Fischer | A61L 2/208 | 53/426 |
| 2010/0119743 A1 | 5/2010 | Thomasset | | |
| 2010/0262114 A1 | 10/2010 | Brandenburger et al. | | |
| 2011/0146837 A1 | 6/2011 | Knapp et al. | | |
| 2011/0293775 A1 * | 12/2011 | Pfeifer | B29C 37/001 | 425/556 |
| 2012/0034374 A1 * | 2/2012 | Okamoto | B29C 48/34 | 427/163.2 |
| 2012/0104010 A1 * | 5/2012 | Kelley | B67C 7/00 | 220/737 |
| 2012/0266567 A1 | 10/2012 | Haesendonckx et al. | | |
| 2013/0228249 A1 * | 9/2013 | Gill | B65D 1/0223 | 141/1 |

FOREIGN PATENT DOCUMENTS

| | | | | |
|---|---|---|---|---|
| DE | 102004023419 A1 * | 12/2005 | | B29C 49/64 |
| DE | 10 2009 060 655 | 6/2011 | | |
| DE | 10 2010 007 541 | 6/2011 | | |
| GB | 1059969 | 2/1964 | | |

* cited by examiner

DEVICE FOR PRODUCING CONTAINER PRODUCTS FROM PLASTICS MATERIAL

FIELD OF THE INVENTION

The invention relates to an apparatus for producing at least one container product from plastic material, which is molded by a molding device, is provided with a predeterminable container contents by a filling device, and is sealed by a sealing device.

BACKGROUND OF THE INVENTION

Methods and apparatuses for the production of container products made of plastic are known in the prior art. For the production of the respective container product(s), a tube of plasticized plastic material is extruded into a mold. One end of the tube already had been or is sealed by welding. The tube is expanded by generating a pneumatic pressure gradient acting on it, and, for the production of the container, it is brought into contact with the shaping walls of the molding device having two opposed individual molded parts. During the execution of the Bottelpack® blow-fill-seal container manufacturing process, which is known in this technical field, the respective filling material is then aseptically filled, via a corresponding filling mandrel into the respective container product. The container product is then closed on its other end after the filling mandrel is pulled away, and hermetically sealed by a sealing device to form a definable head geometry. To create the actual plastic container, in which the fluid or filling material will subsequently be stored, two individual molding parts, for example in the form of molding jaws of the molding device, are movable, for example by hydraulic or servo-electric drives, toward each other for reaching a closed position and in opposite directions, away from each other, into an open position thereof.

In order to reach very high discharge rates of container products in such a BFS (blow fill seal) process, as shown by way of example in U.S. Pat. No. 8,137,096 B2, several adjacent containers are molded at the same time in the molding device to form a container chain with several adjacent containers, for example, eight or ten containers. This process takes less than 4 to 5 seconds in non-synchronized machines.

For synchronized machines, as shown by way of example in EP 1 626 903 B1, the production process may take significantly longer, for example, 10 to 11 seconds. With these known production machines, several stations are arranged successively in the direction of production, in a type of carousel arrangement. The respective tube of plasticized plastic material can be introduced into the mold apparatus in a first station. In a second station, which is subsequent in turning direction, this tube is blow-moldable for creating the container. In a third station, subsequent in the turning direction, the blow molded containers are filled in a sterile manner and can be closed at the head end by a sealing device. In fourth station, again subsequent in the turning direction, the mold separation of the respective blow molded, filled, and sterilely sealed container product takes place.

These per se very advantageous preparation methods all represent more or less high-temperature methods since, with the advantageously used plastic materials, such as a polypropylene material, the homogenization of the molten polymer mass, the distribution in the tube head, and the molding, and especially the tight welding of the container, necessitate relatively high temperatures. Due to the high temperature levels in the molding phase, the per se advantageous BFS methods are very poorly suited for temperature-sensitive filling material. For containers in ampule form, formulations of biotechnologically manufactured drugs and diagnostic agents are often used as filling material. The group of such substances include therapeutic enzymes, clotting factors, numerous hormones, such as insulin, epoetin or growth hormones, monoclonal antibodies, as well as biotechnologically manufactured vaccines. Due to the temperature-related problems, such substances are usually not sold on the market in BFS containers, but in conventional glass bottles.

This problem is known among experts and is the subject of ongoing scientific discussions. In this respect, a publication by Wei Liu, Philippe Lam, et al., published in Bio Pharm International, July 2011, Pages 22 to 29, proposes preventing the degradation of the filling material by supplying pharmaceutical formulations in a very cold state. For processes to be executed quickly for high output rates, this low temperature is difficult to implement because a decrease in temperature results in an increase in viscosity of the filling material, which would require increased filling pressures to achieve the same filling time, which in turn may adversely affect the stability of the filling material due to the shear sensitivity of most proteins. A disadvantage of a cooled supply of the filling material at temperatures of less than 15° C. is the fact that this cooled supply may result in condensation of air humidity in the BFS machine and, in particular, on the filling tube. This condensation causes condensed water to be brushed off on the container opening, which in turn results in leakage during welding of the container. If, as would be obvious, low mold temperatures of less than 15° C. are applied, condensation effects also result, which in turn would require complex and expensive dry air conditioning of the mold surfaces and would result in temperatures of the head region and head jaw of the mold that would no longer ensure tight welding. Lowering of the container wall thickness is also not a reasonable and efficient control value to minimize the available amount of heat acting on the filling material since the container wall thicknesses are determined by defined parameters, such as the allowable permeation (water loss by permeation over the storage period) and the mechanical specifications (mechanical stability, opening behavior, deformability for emptying, etc.).

SUMMARY OF THE INVENTION

An object of the invention is to provide an improved apparatus that allows for providing containers that are filled with temperature-sensitive, biopharmaceutical filling material in the BFS method and that, on one hand, are well molded and tight and, on the other hand, ensure the stability of the filling material as well as that ensured by traditional glass packaging.

According to the invention, this is basically obtained by an apparatus having as a substantial feature of the invention, each finished created container product, with its filling material, supplied to a post-treatment zone outside the molding device in which the respective container product, and/or the respective container contents in the form of filling material, can be subjected to a temperature-influencing effect.

Surprisingly, the stability of the different biopharmaceutical formulations, which make up the filling material, is not greatly affected by the average temperatures during the BFS process or by the maximum temperatures of a portion of the filling material during filling, but is affected to a far greater extent by the progression over time of the temperature at the boundary layer between filling material/container product after sealing the container product. The progression can be influenced in the desired manner by the post-treatment zone provided in accordance with the invention. Through controlled temperature influence during a post-treatment phase in the post-treatment zone, the stability, and in particular the biological activity, of the filling material can be maintained. At the same time, the apparatus can produce well-molded and tight BFS containers.

In a preferred embodiment of the apparatus according to the invention, the proposed post-treatment zone allows convective cooling of the container product, preferably of at least 20 seconds duration, during which the same orientation is preferably maintained for the container product as during filling of the container. A particularly high pharmaceutical stability for the filling material (container content) can be achieved if a cooling effect is applied to the respective container product, while it has at least approximately the same orientation over the duration of the post-treatment in the post-treatment zone as it has had from the filling of the container. In practice, this orientation typically means a continuous vertical orientation. If the post-treatment zone in terms of its possible effect on the respective container product is designed to be long enough in terms of space and/or time, and the movement with stable orientation is ensured as explained, the free convection cooling for a time period of 20 to 30 seconds can already be sufficient to fill some thermally unstable filling materials safely and free from adverse effects.

The advantage resulting from the consistent orientation is probably based on the fact that, with consistent orientation, no boundary layer displacement at the contents/container boundary takes place. A favorable progression over time of the boundary temperature profile is then given.

In a particularly preferred embodiment of the apparatus according to the invention, in the post-treatment zone, at least one tempering device is provided as a post-treatment device, in particular in the form of a cooling device. With a certain complexity in terms of the apparatus, post-cooling of container products can be achieved with certainty after the molding.

In the container products in ampule form, with fill volumes up to 10 ml, that are considered for thermosensitive filling, a filling time that is as short as possible is provided for each filling operation. A dwell time of the container-forming polymer in the sealed manufacturing mold can be less than 7 seconds.

In a particularly advantageous manner, the post-treatment device may include an apparatus for generating a cooling air flow for at least acting upon the respective container product. A flow guide device may be provided for producing a flat air flow of cooled, compressed air that is blown out, which flow guide device generates a directed air flow of compressed cooling air. In this regard, a commercial device "LINEBLOW", which is available from Karger GmbH, Paul-Ehrlich Str. 10a, D-63128 Dietzenbach, may be provided together with a cold air generator "COLDER." This device allows for a generation of flat airflows of, for example, up to 600 mm base length with cold air temperatures of −25° C. that coat the respective container products for post-treatment.

Alternatively or additionally, the post-treatment device may include a type of the cooling tunnel with a passage for the passage of the container chain and with tunnel walls at least partially defining the passage. The tunnel walls may be cooled by a cooling medium flowing through the walls.

As another possibility or in addition to generating a cooling air flow and/or to the cooling tunnel, the post-treatment device may include a freezing or freezer device. For example, the freezer device can be in the form of a flowing liquid nitrogen bath, such as in the form of a CRYOLINE® immersion bath freezer, through which the container chain is passed.

Alternatively, or in addition to the temperature influencing devices, the post-treatment device may also include a feeding of the respective container product, also in the form of a conveyor device. A container chain having conveying elements acting on the container product or the container chain can be created. The conveying elements can be cooled by a coolant flow flowing through them. The post-treatment device thus forms both a cooling device and a conveying device for the respective container product.

Another object of the invention is to provide a method for producing blow-molded and filled container products from plastic material.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
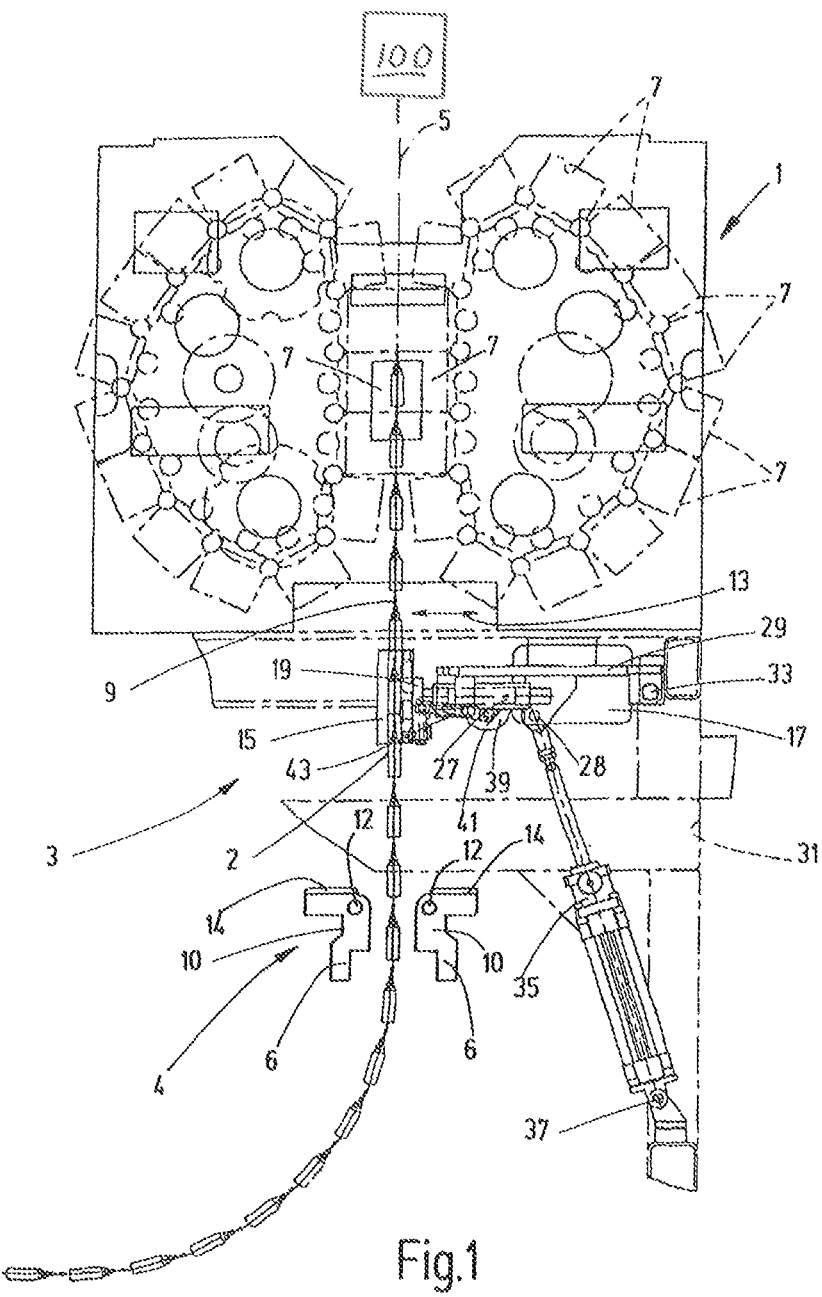
FIG. 1 is a highly simplified side view of an apparatus according to a first exemplary embodiment of the invention.

FIG. 1 shows a first exemplary embodiment of the apparatus according to the invention as part of a non-synchronized, rotational molding machine (not shown), in which the actual molding device 1 is provided with an upstream tube forming extruder 100 and a downstream demolding device 3. Demolding device 3 supports the demolding process of the containers molded in the molding device 1. The molding device 1 is a device for performing a blow-molding process according to the known Bottelpack® blow-fill-seal container manufacturing system. Namely, in one embodiment, as shown in U.S. Pat. No. 8,137,096 B2, various molding portions are performed at different stations along a production line 5. In a type of carrousel or paternoster arrangement, individual mold parts 7, of which only a few are numbered in FIG. 1, are moved toward each other in pairs on an imaginary circular arc paths to form a closed manufacturing mold and are moved apart again to open the mold. Since devices according to the Bottelpack® blow-fill-seal container manufacturing method are known per se, a more thorough explanation of the details of the molding device 1 of FIG. 1 is unnecessary.

As can be seen from this figure, the formed container chain 9 exits along the production line 5 from the demolding device 3 as a container chain 9 at the front exit point 2. As is usual with such devices, the container chain 9 has a large-area shape. A plurality of individual containers, in the present case of ampule-like shape, are adjacent in the container chain 9. For example, the container chain 9 can have eight adjacent ampules. To support the separation of the containers from the walls of the individual mold parts 7 moving away from each other after the molding process, the demolding device 3 applies a deflection movement to the container chain 9, as indicated with the double arrow 13 in FIG. 1. For this purpose, the demolding device 3 has a tappet assembly 15, which generates the deflection movement of the container chain 9, in operational connection with an electric drive motor 17, to safely separate the containers from the mold wall parts.

The tappet assembly 15, together with a frame part 19, forms fixed wall parts of a passage channel for the container chain 9, which ends at the exit point 2. The frame part 19 of the tappet assembly 15 is guided on guideways 27 for deflection movements, extending as indicated by the double arrow 13, which, like the motor 17, are mounted on a device or support part 29. Device or support part 29 is in turn mounted pivotably about a pivot bearing 33 on an apparatus frame 31 of the demolding device 3. At a distance from this pivotable mounting, a linear actuator 35 is hinged on the device or support part 29 in the form of a hydraulic or pneumatic working cylinder 28, which in turn is supported on a hinge point 37 on the apparatus frame 31 at a distance from the pivot bearing 33.

Due to the pivotal mounting of the device or support part 29 of the demolding device 3 on the apparatus frame 31, the demolding device 3 can be folded or pivoted from the working position shown in FIG. 1 to a rest position, in which the tappet assembly 15 is outside the area of the production line 5, for adjustment and maintenance, as well as preparation for start-up, by retracting the linear actuator 35. For the movement of the tappet assembly 15, the motor 17 includes an output gear 39, having an eccentric tappet device 41, converting the rotational movement into a reciprocating motion, which eccentric tappet device 41 is coupled to the frame part 19 by adjustable push rods 43. With this gear assembly, a reciprocating vibrating movement can be applied to the frame part 19. The container chain 9 positioned between the tappet assembly 15 safely separates the molded containers from the mold walls at the front exit point 2, even if difficult to demold materials, particularly polypropylene materials, are used for which high processing temperatures are present.

Figure 2:
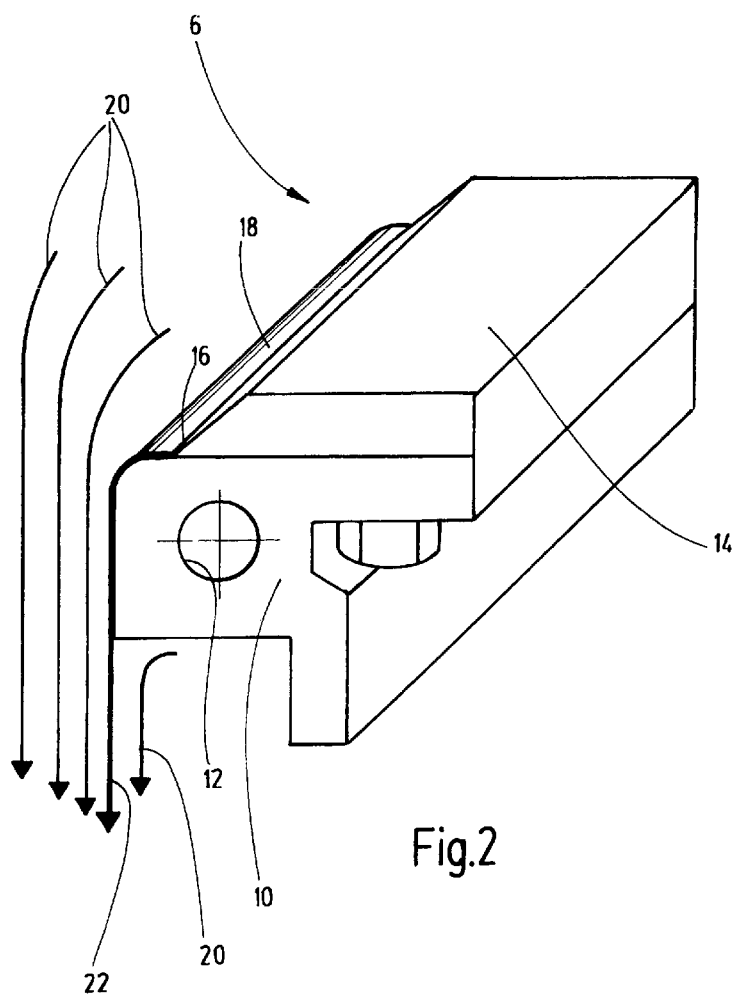
FIG. 2 is an enlarged perspective view of individual blowing strips of the post-treatment device of the exemplary embodiment of FIG. 1.

To avoid damage to temperature-sensitive filling material caused by high processing temperatures, the apparatus according to the invention has a post-treatment device 4. It is disposed along the production line 5 along the container chain 9 after its discharge at the exit point 2 of the demolding device 3. In the first exemplary embodiment of FIG. 1, the post-treatment device 4 has a device for post-cooling the discharged container chain 9 by flat air streams of cooled, blown compressed air. To generate cold flat air streams that coat the container chain on both flat sides, two blowing strips 6 are provided in the example of FIG. 1. Blowing strips 6 are arranged opposite each other on one long side and the other long side next to the container chain 9. One blowing strip 6 is shown separately in FIG. 2. The blowing strips 6 are typical devices of the type "LINEBLOW" in the form of strip bodies with a base length that is adapted to the width of the container chain 9. As FIG. 2 shows most clearly, each blowing strip 6 has a base body 10 having a front-end, compressed air connection 12, which air connection opens out on the planar top surface of the base body 10. A cover plate 14 is screwed to the flat upper surface of the base 10, and tapers and ends at a short distance in front of the edge of the base body 10, which edge is positioned on the left side in FIG. 2. Between the pointed end of the cover plate 14 and the base body 10, a fine air outlet gap 16 is formed for the cold air supplied via the connection 12. The outlet gap 16 has a width of 50 µm. A curvature 18, extending to the lateral edge, is adjacent to the gap 16 at the top side. In this configuration, the blower strip 6, by taking advantage of the Coanda effect, generates a layered air flow 22 along the smooth curve on the curvature 18 from the compressed air blown out at the gap 16 and draws along ambient air 20, so that an air curtain is produced in which about 25 to 30 times as much air is delivered as the compressed air volume supplied via the connection 12. For the operation, compressed air can be supplied through the connection 12 at a temperature of −25° C., produced for example by a cold air generator of the type "COLDER."

Figure 3:
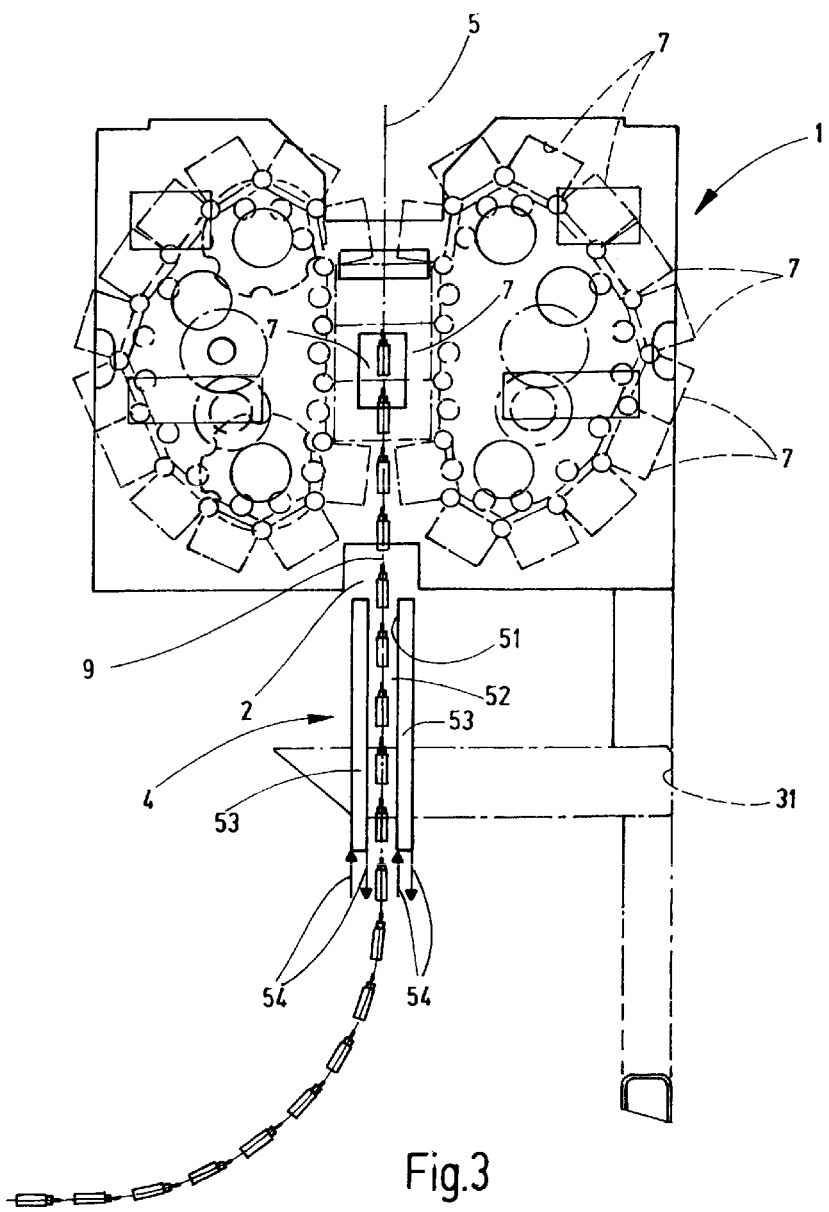
FIG. 3 is a highly simplified side view of an apparatus according to a second exemplary embodiment of the invention, without an associated demolding device.

FIG. 3 shows a second exemplary embodiment of the apparatus according to the invention as part of a non-synchronized rotational molding machine (not shown), in which a forming device 1 is provided without a corresponding demolding device. Again, as in the example of FIG. 1, a post-treatment device 4 is provided after the exit point 2, at which exit point the container chain 9 exits the molding device 1. In this exemplary embodiment, the post-treatment device 4 includes a cooling tunnel 51. Cooling tunnel 51 is directly adjacent to the exit point 2 of the mold 1 and forms a passage 52 for the passage of the container chain 9. It is limited on both sides of the container chain 9 by tunnel walls. The tunnel walls are each formed by the inner surface of a cooling plate 53, are opposite each other and extend on one side and the other side of the container chain 9 in the longitudinal direction of the production line 5. The cooling plates 53 extend over a longitudinal section of the container chain 9, corresponding to the length of several ampules and selected to have a length so that a dwell time or cooling time for post-cooling of about 40 to 60 seconds duration results. The cooling plates 53, which extend over the entire width of the multi-row container chain 9, have inner fluid guides for a cooling fluid circulating in the cooling plates 53 through connections 54, which are connected to a cooling circuit. Depending on the desired cooling capacity, different refrigerants come into consideration, such as water-glycol cooling liquids, cold air, liquid or gaseous nitrogen, or compressed refrigerants. The cooling plates 53 can form evaporators.

Figure 4:
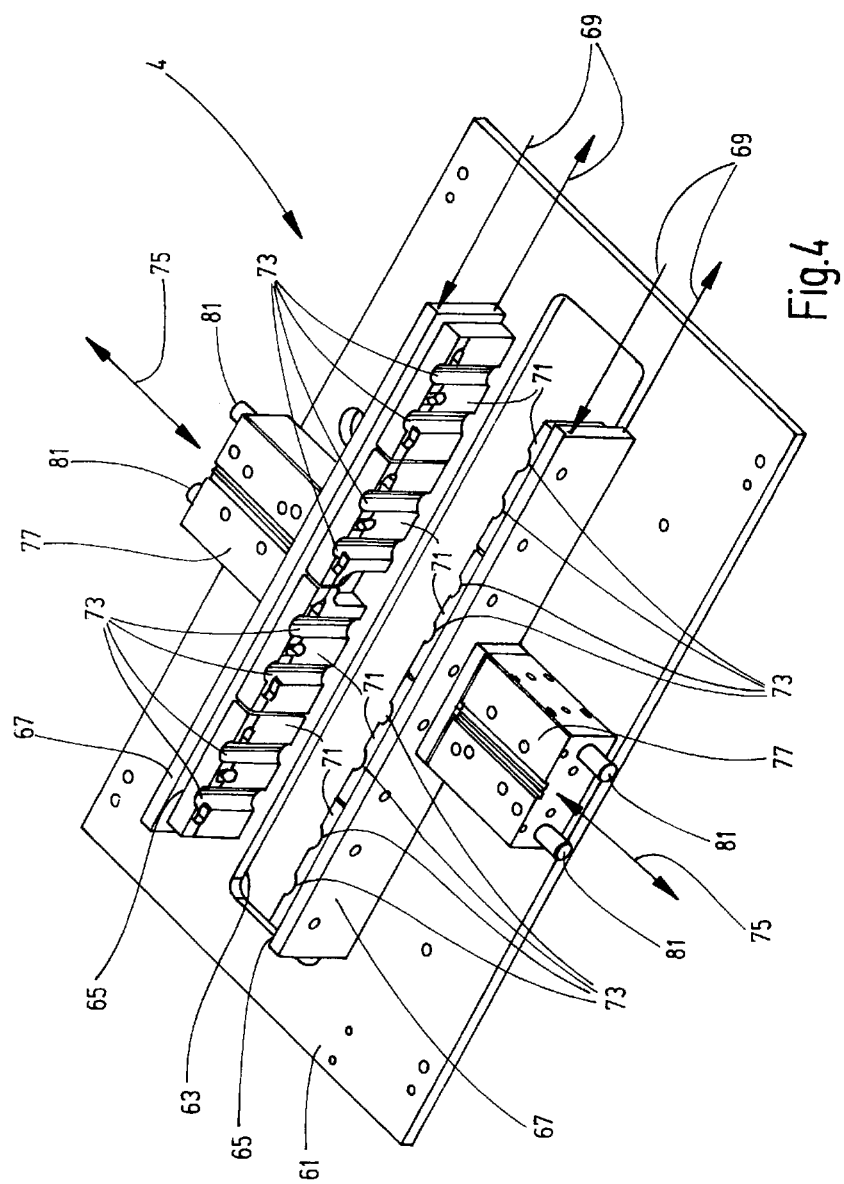
FIG. 4 is a perspective view of an individual depiction of a post-treatment device in the form of a combined cooling and conveying apparatus according to a third exemplary embodiment of the invention.

FIG. 4 shows, for a third exemplary embodiment of the apparatus according to the invention, a post-treatment device 4 in the form of a combined conveying and cooling device, as they could be easily used even with synchronized molding machines. It includes a base plate 61 of rectangular-shaped outline, having a centrally located passage 63 for the container chain 9, extending parallel to the long sides of the rectangular shape showing the post-treatment device 4 in an individual representation.

Strips 65 are provided as cooling and conveying elements, having an identical form and each of which extends along a long side of the passage 63 on both sides of the container chain 9 lying therebetween. Each strip 65 is composed of an outer cooling plate 67, which are also formed identically and each of which have a structure corresponding to that of the cooling plates 53 of the cooling tunnel 51 of FIG. 3. As with those cooling plates 53, the cooling plates 67 also have front-side connections 69 for connecting to a cooling circuit.

Similarly, a cooling medium can flow through the cooling plates 67, again similarly to the cooling tunnel 51 of FIG. 3. Tappet bodies 71 are mounted on the insides of the cooling plates 67, forming the actual conveyance elements, in which recessed ampule receivers 73 are formed. The strips 65, which are shown in a separated position in FIG. 4, are guided movably toward and away from each other on the base plate 61, as indicated by the double arrows 75. For these movements, each strip 65 is connected with a linear actuator 77, having connections 81 for actuation by a pressure medium. Electro-mechanically operable linear actuators 77 may also be provided. For the combined conveying and cooling function, the strips 65, along with the cooling plates 67 and the ampule receivers 73, are moved against each other, so that the containers are received in the ampule receivers 73 and a cooling process takes place. The base plate 61, with the strips 65 moved together, is then moved in the conveying direction of the container chain 9 along the production line 5 by a lifting drive, not shown, which in turn may again be operated by a pressure medium or electro-mechanically, over a time period corresponding to the desired post-cooling time. The strips 65 are then moved apart, and the base plate 61, along with the strips 65, is then moved upward to the starting position for a subsequent cooling and conveying step for which the strips 65 are again moved back towards each other.

As can be seen, the post-treatment in the post-treatment devices 4 shown is preferably carried out each time with the containers located in unchanged position, i.e., in the filling position with the head region of the containers at the top. The boundary layer structure of the filling material/container wall thus remains undisturbed during the post-treatment. As already indicated above, the types of post-treatment devices 4 shown may be provided individually or in combination with one another in any order. Preferably a post-treatment device 4 is disposed immediately downstream of the exit point 2 of the molding device 1.

In examples given below, the results achievable by the post-treatment according to the invention are indicated.

In the examples, a BFS system is used along with post-cooling/post-conditioning, immediately subsequent to the discharge from the BFS machine, which substantially maintains the orientation of the containers (e.g., container head upwards) as during filling. The post-cooling took about 10-60 seconds and was implemented with flat air flows of cooled, blown compressed air. A commercial device "LINE-BLOW" (with 60 mm blowing length, manufactured by Karger GmbH, Paul-Ehrlich Str. 60a, D-63128 Dietzenbach, was used together with two "COLDER" cold air generators (cold air temperature −25° C.). Comparable results were achieved with a cooling tunnel, in which the containers are transported in a cold air flow between two cooled plates having an equivalent cooling capacity.

Examples with known temperature-sensitive, liquid pharmaceuticals:

Formulations:

-a- Adalimumab

Machine Bottelpack® blow-fill-seal container manufacturing type 460 (non-synchronized) by Rommelag Material: low density polyethylene, LDPE Lyondell Basell 3020 D LDPE Filling volume 0.8 ml; 1.5 ml BFS ampule Parameters:

| | |
|---|---|
| Polymer temperature at tube exit ° C. | 180 |
| Filling temperature filling material ° C. | 15 |
| Filling time s | 1 |
| Time tube free to tube in mold s | 5.5 |
| Time tube in mold s | 5.5 |
| Mold temperature ° C. | 20 |
| Time between molding and filling s | 0.6 |
| Time discharge from BFS to post-conditioning s | 30 |
| Post-conditioning type | flat stream of compressed air, orientation stable, |
| Post-conditioning duration s | 30 |
| Cold air flow rate liters per min | 150 |

Formulation: Adalimumab (Humira®) 40 µg in phosphate/citrate buffered, aqueous solution, containing the following stabilizers: mannitol, NaCl and polysorbate 80.

After filling and 1 to 3 and 12 months of storage at 2° C. to 8° C., there was no significant difference in the biological activity/stability (agglomerates, pH, discoloration, precipitation, etc.) compared to a commercially available packaging configuration in glass vials.

If, prior to or in the post-treatment zone, the containers are not moved with stable orientation, i.e., the container is rotated, turned, or tilted, the biological activity is significantly reduced even after 30 days, compared to transportation with a stable orientation, while similar movements in the glass vial packaging or containers manufactured with stable orientation according to the invention showed no significant activity changes.

-b- Epoetin Alfa

Machine Bottelpack® blow-fill-seal container manufacturing type 460 (non-synchronized) by Rommelag Material: LDPE Lyondell Basell 1840 H Filling volume 1 ml in 2 ml BFS ampule Parameters:

| | |
|---|---|
| Polymer temperature at tube exit ° C. | 170 |
| Filling temperature filling material ° C. | 17 |
| Filling time s | 1.2 |
| Time tube free to tube in mold s | 6 |
| Time tube in mold s | 6 |
| Mold temperature ° C. | 17 |
| Time between molding and filling s | 0.6 |
| Time discharge from BFS to post-conditioning s | 25 |
| Post-conditioning type | flat stream of compressed air |
| Post-conditioning duration s | 50 |
| Cold air flow rate liters per min | 200 |

Formulation: Epoetin alfa: 10,000 IU/ml in phosphate buffered, aqueous solution, containing the following stabilizers: aminoacetic acid, NaCl, and polysorbate 80.

After filling and 1 to 3 and 12 months of storage at 2° C. to 8° C., there was no significant difference in the biological activity/stability compared to a packaging configuration in glass vials.

-c- Interferon Beta-1a

Machine Bottelpack® blow-fill-seal container manufacturing type 321 (synchronized) by Rommelag Material: LDPE Lyondell Basell 1840 H Filling volume 0.5 ml in 1 ml BFS ampule Parameters:

| | |
|---|---|
| Polymer temperature at tube exit ° C. | 172 |
| Filling temperature filling material ° C. | 20 |
| Filling time s | 1 |
| Time tube free to tube in mold s | 5.5 |
| Time tube in mold s | 5.5 |
| Mold temperature ° C. | 20 |
| Time between molding and filling s | 0.5 |
| Time discharge from BFS to post-conditioning s | 30 |
| Post-conditioning type | flat stream of compressed air |
| Post-conditioning duration s | 30 |
| Cold air flow rate liters per min | 40 |

Formulation: 33 µg/ml Interferon beta-1a in acetate buffered aqueous solution (pH 4), containing the following additional ingredients: poloxamer 188, L-methionine, benzyl alcohol.

After filling and 1 to 3 and 12 months of storage at 2° C. to 8° C., there was no significant difference in the biological activity/stability compared to a packaging configuration in prefilled syringes.

If the containers are not moved in stable orientation prior to or in the post-treatment zone, the biological activity compared to the orientation stable transport was significantly reduced. Similar movements of the container proceded with stable orientation after completion of post-conditioning showed no significant changes in product stability.

-d- Trastuzumab

Machine Bottelpack® blow-fill-seal container manufacturing type 321 (synchronized) by Rommelag Material: LDPE Lyondell Basell 3020 D Filling volume 7 ml in 10 ml BFS ampule Parameters:

| | |
|---|---|
| Polymer temperature at tube exit ° C. | 180 |
| Filling temperature filling material ° C. | 15 |
| Filling time s | 1.2 |
| Time tube free to tube in mold s | 6 |
| Time tube in mold s | 6 |
| Mold temperature ° C. | 20 |
| Time between molding and filling s | 0.6 |
| Time discharge from BFS to post-conditioning s | 15 |
| Post-conditioning type | flat stream of compressed air |
| Post-conditioning duration s | 50 |
| Cold air flow rate liters per min | 400 |

Formulation: 21 ug/ml Trastuzumab in aqueous solution (pH 6) containing the following additional ingredients: L-histidine, L-histidine a, a-trehalose dihydrate, polysorbate 20.

After filling and 1 to 3 and 12 months of storage at 2° C. to 8° C., there was no significant difference in the biological activity/stability compared to a packaging configuration in glass ampules.

-e- Filgrastim

Machine Bottelpack® blow-fill-seal container manufacturing type 321 (synchronized) by Rommelag Material: *Borealis* LE 6601-PH Polyolefin Filling volume 1.6 ml in 2.5 ml BFS ampule Parameters:

| | |
|---|---|
| Polymer temperature at tube exit ° C. | 170 |
| Filling temperature filling material ° C. | 20 |
| Filling time s | 1 |
| Time tube free to tube in mold s | 4.5 |
| Time tube in mold s | 4.5 |
| Mold temperature | 15 |
| Time between molding and filling s | 0.6 |
| Time discharge from BFS to post-conditioning s | 20 |
| Post-conditioning type | flat stream of compressed air |
| Post-conditioning duration s | 60 |
| Cold air flow rate liters per min | 100 |

Formulation: 480 µg Filgrastim aqueous solution, containing the following additional ingredients: sodium acetate, sorbitol, and polysorbate 80 (Tween 80).

After filling and 1 to 3 and 12 months of storage at 2° C. to 8° C., there was no significant difference in the biological activity/stability compared to a packaging configuration in prefilled glass syringes.

-f- Rotavirus Vaccine

Machine Bottelpack® blow-fill-seal container manufacturing type 312 (synchronized) by Rommelag Material: Polypropylene PP Lyondell Basell Purell SM170G Filling volume 1 ml in 2.5 ml BFS drinking ampule Parameters:

| | |
|---|---|
| Polymer temperature at tube exit ° C. | 192 |
| Filling temperature filling material ° C. | 18 |
| Filling time s | 1.1 |
| Time tube free to tube in mold s | 6.5 |
| Time tube in mold s | 6.5 |
| Mold temperature ° C. | 18 |
| Time between molding and filling s | 0.5 |
| Time discharge from BFS to post-conditioning s | 35 |
| Post-conditioning type | flat stream of compressed air |
| Post-conditioning duration s | 65 |
| Cold air flow rate liters per min | 150 |

Formulation: Human rotavirus (live, attenuated) at least 106.0, CCID50 in aqueous solution, inter alia, with the other auxiliaries, additives: sucrose, dextran, sorbitol, calcium carbonate, as well as xanthan gum.

After filling and 1 to 3 and 12 months of storage at 2° C. to 8° C., there was no significant difference in the biological activity/stability compared to a packaging configuration in a polyethylene tube.

-g- Octreotide Acetate

Machine Bottelpack® blow-fill-seal container manufacturing type 312 (synchronized) by Rommelag Material: Polypropylene PP Lyondell Basell Purell SM170G Filling volume 5 ml in 7.5 ml BFS ampule Parameters:

| | |
|---|---|
| Polymer temperature at tube exit ° C. | 175 |
| Filling temperature filling material ° C. | 1 |
| Filling time s | 1.2 |
| Time tube free to tube in mold s | 6 |
| Time tube in mold s | 6 |
| Mold temperature | 20 |
| Time between molding and filling s | 0.6 |
| Time discharge from BFS to post-conditioning s | 25 |
| Post-conditioning type | flat stream of compressed air |
| Post-conditioning duration s | 50 |
| Cold air flow rate liters per min | 300 |

Formulation: 4.4 mg/ml octreotide acetate in aqueous solution, inter alia, with the further auxiliaries, additives: mannitol, sodium carboxymethyl cellulose.

After filling and 1 to 3 and 12 months of storage at 2° C. to 8° C., there was no significant difference in the biological activity/stability compared to a packaging configuration in a polyethylene tube.

In a preferred embodiment of the device according to the invention, not shown in further detail, a post-treatment device, such as a cooling device, can be omitted entirely for some filling materials that are not too thermally unstable. For example, it may be sufficient to provide a post-treatment zone after the exit point of the respective container product that allows for convective cooling of the container for at least 20 seconds, preferably for a duration from 20 to 30 seconds. Advantageously, as already explained, that the respective container product has an orientation in the post-treatment zone, which is approximately equal to the orientation of the container product during container filling.

Instead of individual container products which can also be connected in an arrangement beside each other via a carton composite (not shown), the configuration of the container composite is also possible by the container chain 9 arranged one on top of the other, as described above. However, the post-treatment zone discussed, as well as any post-treatment devices, can also be used in devices, in which only individual container products are molded, filled, and sealed and delivered to the exit of a molding device. Regardless, a temperature treatment, particularly in the form of cooling, should only be applied to the container product after it is sealed. Previous cooling could otherwise adversely affect the head-end sealing process of the container product because correspondingly sufficiently high mold temperatures must be present in the plastic material for the respective molding process.

The post-treatment zone, which is aimed at convective ambient cooling of the containers, is not shown directly in the figures. If the cooling device 53 shown for example in FIG. 3 was completely omitted, the convective air flow could directly reach the containers of the container line 9 without further hindrance as soon as they exit the molding device 1. To be able to achieve a sufficient cooling effect, increasing the length of the convective post-treatment zone by at least four times, but preferably five times, the preset length within the mold production line, is advantageous. The mold production line in this case is substantially determined by the length of the molding device 1, which is required after closing the upper pairs of mold halves 7 for container production, until, at the bottom end of the molding device 1, the corresponding mold pairs 7 move apart again and release the container products of the container chain 9. The respective mold production line must then be extended by a factor of 4 to 5 or more, starting from the release of the container product at the bottom end of the molding device 1, specifically, according to the illustration in FIG. 3, preferably in the vertical direction in order not to change the relative position between the container wall and the received container contents. After crossing the thus extended post-treatment zone (not shown), preferably by a factor of 4 to 5 of the production line, cooling then takes place in such a manner that the deflection of the container chain 9 to the left for further processing, as shown by way of example in FIG. 3, can be easily accomplished.

While various embodiments have been chosen to illustrate the invention, it will be understood by those skilled in the art that various changes and modifications can be made therein without departing from the scope of the invention as defined in the claims.

The invention claimed is:

1. An apparatus for producing a container product from plastic material, the apparatus comprising:
   an extruder forming a plastic tube;
   a blow molding device being located vertically below and downstream of said extruder and having relatively movable individual mold parts being rotatable about a horizontal axis, forming a container that is empty and open from the plastic tube, having a content filler filling the container with a predeterminable container content and having a sealing device sealing the container after filling to produce, fill and seal the container product while still in the molding device, the respective mold parts being movable toward and away from one another in pairs to open and close the mold parts and discharging the container product after being produced, filled and sealed downwardly along a vertical axis; and
   a temperature influencer in a post-treatment zone downstream of said sealing device extending along the vertical axis and exerting a temperature-influencing effect on the container product, said temperature influencer being a cooler through which the container product passes into and completely through said cooler along the vertical axis after exiting said blow molding device, said cooler including a cooling tunnel having a passage completely through which the container product is conveyed along the vertical axis and having tunnel walls at least partially defining said passage, said tunnel walls being cooled by a cooling medium flowing through said tunnel walls.

2. The apparatus according to claim 1 wherein said temperature influencer subjects the container product to a cooling duration of at least 20 seconds and maintaining the container product in a same orientation as during filling of the container.

3. The apparatus according to claim 1 wherein the apparatus has a dwell time of less than 7 seconds in a sealed production stage of the container product in the mold parts.

4. The apparatus according to claim 1 wherein said temperature influencer exerts a cooling effect on the container product and maintains the container product in a same orientation substantially over a duration of the container product in said post-treatment zone.

5. The apparatus according to claim 1 wherein said tunnel walls extend parallel to one another and to the vertical axis and define openings at top and bottom ends thereof through which the container product enters and exits, respectively, along the vertical axis.

6. The apparatus according to claim 5 wherein said tunnel walls have a length corresponding to a length of plural container products along the vertical axis.

7. The apparatus according to claim 5 wherein the length of said tunnel walls provides a cooling time of each container product of 40 to 60 seconds.

8. The apparatus according to claim 5 wherein said tunnel walls extend over an entire width of a multi-row container product chain.

9. The apparatus according to claim 5 wherein only two of said tunnel walls are provided.

10. An apparatus for producing a container product from plastic material, the apparatus comprising:
- an extruder forming a plastic tube;
- a blow molding device being located vertically below and downstream of said extruder and having relatively movable individual mold parts being rotatable about a horizontal axis, forming a container that is empty and open from the plastic tube, having a content filler filling the container with a predeterminable container content and having a sealing device sealing the container after filling to produce, fill and seal the container product while still in the molding device, the respective mold parts being movable toward and away from one another in pairs to open and close the mold parts and discharging the container product after being produced, filled and sealed downwardly along a vertical axis; and
- a temperature influencer in a post-treatment zone downstream of said sealing device extending along the vertical axis and exerting a temperature-influencing effect on the container product, said temperature influencer being a cooler through which the container product passes into and completely through said cooler along the vertical axis after exiting said blow molding device, said cooler being a conveyor advancing the container product vertically along the vertical axis and having conveyor elements cooled by a coolant flowing through said conveyor elements.

11. The method according to claim 10 wherein the container product is cooled for at least 20 seconds.

12. The method according to claim 11 wherein the container product is maintained in a same orientation as in the filling.

13. The apparatus according to claim 10 wherein said conveyor comprises a base plate movable between upper and lower positions along the vertical axis.

14. The apparatus according to claim 13 wherein said cooler comprises first and second cooling plates being mounted on said base plate and movable along a horizontal axis between open and closed positions thereof by actuators, said cooling plates being cooled by a cooling medium flowing through said cooling plates.

15. The apparatus according to claim 14 wherein said first and second cooling plates extend along sides of a passage in said base plate through which the container product can pass.

16. The apparatus according to claim 14 wherein said first and second cooling plates have recesses conforming to the container product.

17. A method for producing a blow-molded and filled container product, comprising the steps of:
- extruding a plastic tube from an extruder;
- forming a container that is empty and open made from the plastic tube by blow molding in a molding device being located vertically below and downstream of the extruder and having individual molding parts rotatable about a horizontal axis and moveable toward and away from one another in pairs to open and close a manufacturing mold in which the container is molded;
- filling the container with a container content while the container is still in the molding parts;
- sealing the container after filling while still in the molding parts to produce the container product;
- discharging the container product after sealing from the molding parts along a vertical axis;
- supplying the container product into a post-treatment zone being downstream of and at an exit point of the molding device and extending along the vertical axis; and
- subjecting the container product to cooling after exiting the molding device and when passing into and completely through the post-treatment zone, a cooling tunnel extending along the vertical axis and having a passage through which the container product is conveyed along the vertical axis within and completely through the passage within tunnel walls of the cooling tunnel that are cooled by a cooling medium flowing through the tunnel walls.

18. The method according to claim 17 wherein the container product is maintained in a same orientation as in the filling.

19. The method according to claim 17 wherein a dwell time of the container product after sealing in the mold parts is set to be less than 7 seconds.

20. The method according to claim 17 wherein the tunnel walls extend parallel to one another and to the vertical axis and define openings at top and bottom ends thereof through which the container product enters and exits, respectively, along the vertical axis.

21. The method according to claim 20 wherein the tunnel walls have a length corresponding to a length of plural container products along the vertical axis.

22. The method according to claim 20 wherein the length of said tunnel walls provides a cooling time of each container product of 40 to 60 seconds.

23. The method according to claim 20 wherein the tunnel walls extend over an entire width of a multi-row container product chain.

24. The method according to claim 20 wherein only two of said tunnel walls are provided.

25. A method for producing a blow-molded and filled container product, comprising the steps of:
- extruding a plastic tube from an extruder;
- forming a container that is empty and open made from the plastic tube by blow molding in a molding device being located vertically below and downstream of the extruder and having individual molding parts rotatable about a horizontal axis and moveable toward and away from one another in pairs to open and close a manufacturing mold in which the container is molded;
- filling the container with a container content while the container is still in the molding parts;
- sealing the container after filling while still in the molding parts to produce the container product;
- discharging the container product after sealing from the molding parts along a vertical axis;
- supplying the container product into a post-treatment zone being downstream of and at an exit point of the molding device and extending along the vertical axis; and
- subjecting the container product to cooling after exiting the molding device and when passing into and completely through the post-treatment zone by conveyor elements extending and movable along the vertical axis and being cooled by coolant flowing through the conveyor elements.

26. The method according to claim 25 wherein the conveyor comprises a base plate movable between upper and lower positions along the vertical axis.

27. The method according to claim 26 wherein the cooler comprises first and second cooling plates being mounted on the base plate and movable along a horizontal axis between open and closed positions thereof by actuators, the cooling plates being cooled by a cooling medium flowing through the cooling plates.

28. The method according to claim 27 wherein the first and second cooling plates extend along sides of a passage in said base plate through which the container product passes.

29. The method according to claim 27 wherein the first and second cooling plates have recesses conforming to the container product.

\* \* \* \* \*